(12) United States Patent
Palermo (10) Patent No.: US 10,058,210 B2
(45) Date of Patent: Aug. 28, 2018

(54) VERSATILE COOKER

(71) Applicant: Raymond Palermo, Marietta, GA (US)

(72) Inventor: Raymond Palermo, Marietta, GA (US)

( * ) Notice: Subject to any disclaimer, the term of this patent is extended or adjusted under 35 U.S.C. 154(b) by 872 days.

(21) Appl. No.: 14/068,615

(22) Filed: Oct. 31, 2013

(65) Prior Publication Data
US 2015/0114238 A1    Apr. 30, 2015

(51) Int. Cl.
*A47J 37/06* (2006.01)
*A47J 37/07* (2006.01)

(52) U.S. Cl.
CPC ......... *A47J 37/0623* (2013.01); *A47J 37/067* (2013.01); *A47J 37/0763* (2013.01)

(58) Field of Classification Search
CPC ... A47J 37/0623; A47J 37/0763; A47J 37/067
USPC .......................................................... 99/401
See application file for complete search history.

(56) References Cited

U.S. PATENT DOCUMENTS

| 4,463,746 | A | * | 8/1984 | Knuth | A47J 37/0763 126/25 R |
| 5,404,864 | A | * | 4/1995 | Kent, Jr. | A47J 37/0763 126/25 B |
| 5,425,352 | A | * | 6/1995 | Gillam | A47J 37/0763 126/25 R |
| 5,797,386 | A | * | 8/1998 | Orr | A47J 37/0704 126/25 A |
| 6,941,942 | B2 | * | 9/2005 | Eisinger | A47J 37/0786 126/245 |
| 2015/0068512 | A1 | * | 3/2015 | Mehler | A47J 33/00 126/25 R |

* cited by examiner

*Primary Examiner* — Omar Flores Sanchez
(74) *Attorney, Agent, or Firm* — Smith Tempel Blaha LLC; Gregory Scott Smith (57) ABSTRACT

A versatile cooker that includes a crucible or base, a fire bowl with a cooking surface on top of it and, a cover/lid or dome that rests over the cooking surface. An exemplary embodiment of the cooker can be described as a naturally fired outdoor cooker constructed of a light weight, thermally insulated material such as Autoclaved Aerated Concrete (AAC) as the crucible, a stainless steel fire bowl and a dome lid. A grilling surface constructed out of carbon steel and ceramic disks are used as internal heat sinks.

20 Claims, 12 Drawing Sheets

VERSATILE COOKER

BACKGROUND

It may be disputable but, it is quite probably that mankind's quest to have the perfect steak, as well as paella, was born very soon after mankind first discovered how to start a fire. Today, the market is completely saturated with a staggering array of cookers, grillers, smokers and fryers. The come in all shapes and sizes, built in accessories, knobs, wheels, interfaces to a trailer hitch, etc. One can buy portable, stationary, indoor, outdoor and towable versions. Driving up to the local home improvement store, one is met in the parking lot with a parade of such cookers, smokers, grillers, etc., like puppies in a pet store window tempting you to grab one and take it home.

In addition, there is always that quest for the awesome taste of well grilled food, such as steak, chicken, vegetables, etc., without having to wait in a long line while holding a coaster-light-flashing-buzzer contraption, while your kids are crawling around on the floor or all over you, asking "how much longer" as you impatiently stare at the device, wondering if it is broken and wondering when it will flash and buzz. Such a quest has driven many a parent to the local store to snap up that grill and take life back into their own hands.

However, what may occur more often than not, is that this really fancy, gadget laden, slick, painted, state of the art looking cooking machine that lured you into a spur of the moment purchase, once assembled and put to work, is found to be greatly wanting. The fancy and cool factor of many of the products available today has overtaken the actual functional aspects of the products. You may be cursing as your steaks fire up in flames, or your chicken turns black on the outside while still raw in the middle, or your burgers are dried out. It seems quite often that manufactures create a "good looking" cooking machine, and then retrofit it with the cooking guts. The results, a great looking grill that just sits in the rain, seldom used because the purchaser cannot seem to get a consistent heat level, control the heat level, have a uniformly distributed cooking surface, etc.

What is needed in the art is a cooking device that has been designed with its main focus being its foremost purpose—cooking Another issue that many face is what style of cooking device to purchase. Do they want a smoker, griller, fryer, oven, etc. Many products on the market claims to address the multi-purpose cooking segment but, as previously described, they generally look good but are inadequately designed such that they do not function properly or well.

What is needed in the art is a cooking device that not only operates as a professional quality cooking device, but that can also be used for a variety of cooking types and scenarios.

BRIEF SUMMARY

The present disclosure presents various embodiments, features, aspects, functions, characteristics, etc. of a versatile cooker. In general, embodiments include a crucible or base, a fire bowl with a cooking surface on top of it and, a cover/lid or dome that rests over the cooking surface. An exemplary embodiment of the cooker can be described as a naturally fired outdoor cooker constructed of a light weight, thermally insulated material such as Autoclaved Aerated Concrete (AAC) as the crucible, a stainless steel fire bowl and a dome lid. A grilling surface constructed out of carbon steel and ceramic disks are used as internal heat sinks.

The cooker is aspirated through the use of one or more openings, each opening or at least one opening being a venturi. The venturi opening automatically operates or is configured to regulate the amount of airflow that is brought to the fire based at least in part on the airflow demand created by the fire.

In a particular embodiment, the crucible or base is constructed of AAC or an equivalent, and thus has an insulating quality that exceeds that of ceramic. As such, the crucible concentrates the heat to the cooking surface and/or cooking area or chamber.

Various embodiments of the versatile cooker can be used as a stovetop device, a grill, a high heat oven, a wok cooker, as well as a variety of other uses. The various embodiments of the cooker advantageously utilize one or more of three heat types: radiant, conductive and convection. An example of radiant heat is the heat transferred and used to cook a device that is held near to a flame or source of heat. For example, a hotdog being held on a stick next to a flame. Conductive heat is heat that is delivered from a source to a destination through another medium, such as a cooking surface as in the case of a frying pan. As such, a hotdog in a frying pan would be exposed to conductive heat. Convection is when heat is transferred around an object to be cooked in a fluid type medium, including air, water, etc. For instance, a hotdog in a pot of boiling water would be cooked by means of convection.

One advantage of the various embodiments of the versatile cooker is that all three of these heat types can be applied in tandem or simultaneously. As an example, in one embodiment of the versatile cooker in which a stone cooking surface is utilized, a pizza and be cooked. The pizza dough would lie on the stone and be cooked from the boom using conductive heat. The edges of the pizza can be toasted, crispy and maybe even a touch of burnt from the flame licking up around the stone, cooking surface for radiant heat. Finally, the cheese and ingredients on top of the pizza are cooked by air in the dome or cover of the cooker. As another example, a steak can be cooked within the versatile cooker utilizing each of these three heat sources as follows: the steak is seared by laying it on a thick piece of cut carbon steel grilling surface heated to a high temperature, such as 900 degrees F. (conductive), while the meat is charred on its surface by the flames and coals through the openings in the grill (radiant) and surrounded by a constant air temperature under the dome or lid (convection). In addition to these three heating techniques, the smoke from the heat source is also infused into the cooking environment.

Further features, advantages, characteristics, aspects, etc., that can be incorporated into various embodiments of the versatile cooker are presented in more detail in the following description, with reference being made to the various drawings.

DETAILED DESCRIPTION OF EMBODIMENTS OF THE INVENTION

The presently described embodiments, as well as features and aspects thereof, is directed towards a new cooker structure and method.

Figure 1:
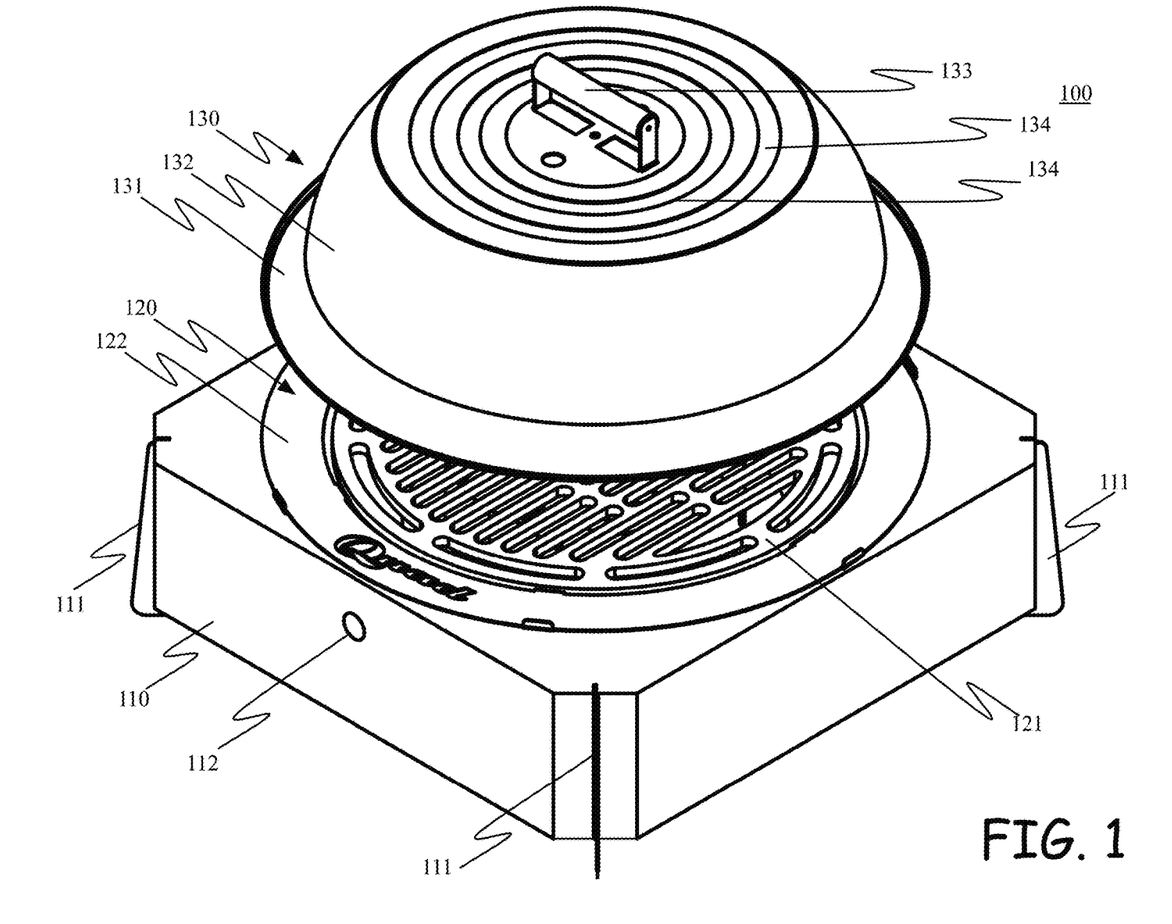
FIG. 1 is a perspective drawing of one embodiment of the versatile cooker.

FIG. 1 is a perspective drawing of one embodiment of the versatile cooker. The cooker 100 is illustrated as including a base 110, a heat or fire bowl 120 and a dome cover or lid 130. In the illustrated embodiment, the base 110 is shown as being a single piece; however, in some embodiments the base may be split into a variety of pieces such as multiple slices stacked on top of each other, or divided into sections, such as halves, quads, etc.

Figure 2:
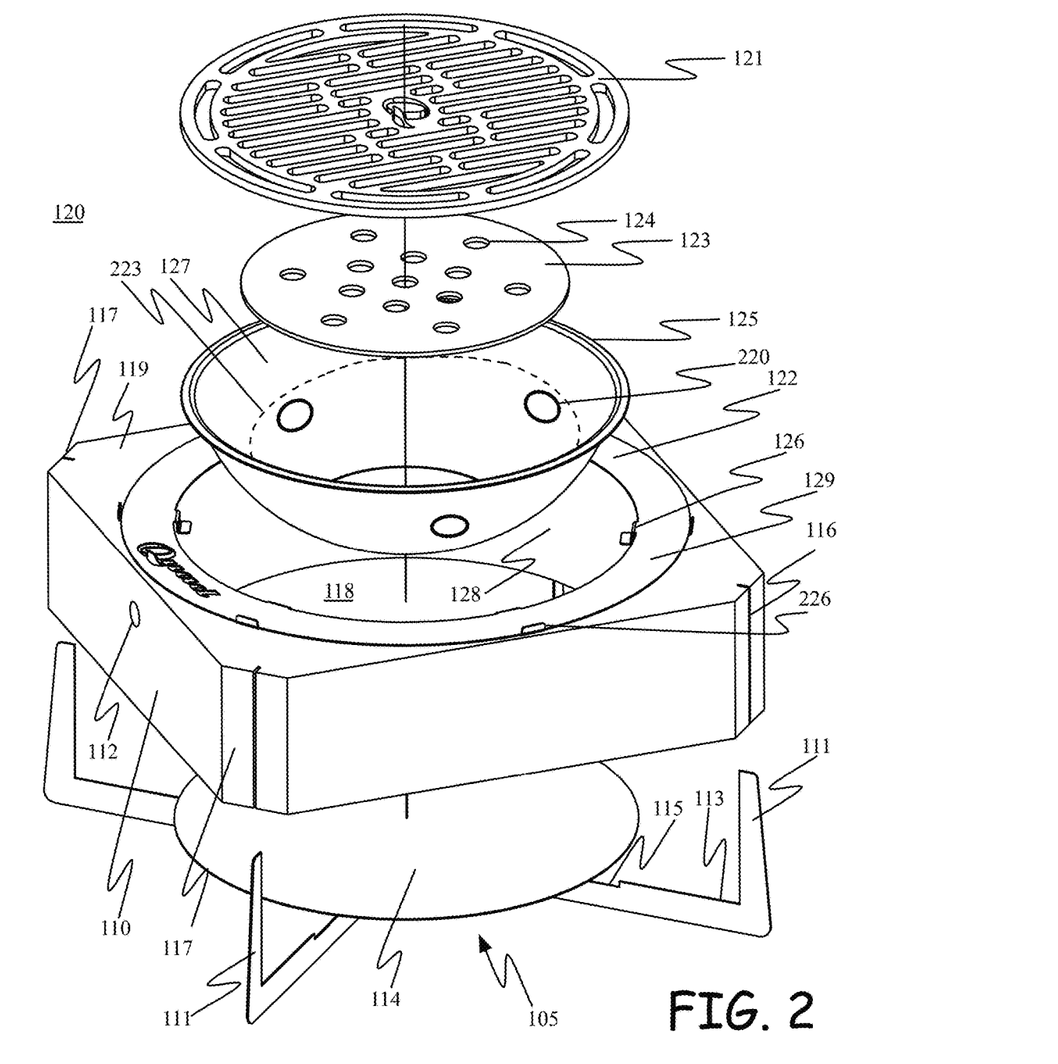
FIG. 2 is an exploded view of the embodiment of the cooker illustrated in FIG. 1 with the exception of the lid 130.

FIG. 2 is an exploded view of the embodiment of the cooker illustrated in FIG. 1 with the exception of the lid 130. Looking at both FIG. 1 and FIG. 2, the elements of the three main elements of the cooker 100 can best be described.

The Base

In general, the base 110 operates as a fire pit, holding the components of the fire bowl 120 in place and providing insulation from the surface on which the cooker 100 rests and other nearby elements. The base can be fabricated from a variety of materials as long as the materials can withstand the heat and, provided the necessary insulation. In one embodiment, the base 110 is constructed from Autoclaved Aerated Concrete (AAC). AAC, also known as autoclaved cellular concrete (ACC), autoclaved lightweight concrete (ALC), autoclaved concrete, cellular concrete, porous concrete, YTONG, HEBEL BLOCK, AIRCRETE, THERMALITE, or BCA (as non-limiting examples), is a lightweight, precast building material that simultaneously provides structure, insulation, and fire/mold resistance. Throughout this disclosure, the term AAC will be used to represent all classes of this type of material. AAC products include blocks, wall panels, floor and roof panels, fireproof liners for elevator shafts, firewalls in condos and commercial buildings and lintels.

AAC has been refined into a highly thermally insulating concrete-based material that is light and easy to work with. Unlike most other concrete applications, AAC is typically produced using no aggregate larger than sand granules. Quartz sand, lime and/or cement and water are used as a binding agent. Aluminum powder may be used at a rate of 0.05%-0.08% by volume (as a non-limiting example and depending on the pre-specified or desired density). In some countries, like India and China, fly ash generated from thermal power plants and having 50-65% silica content is used as an aggregate.

When AAC is mixed and cast in forms, several chemical reactions take place that attribute to the light weight of AAC, which is typically about 20% of the weight of concrete. These chemical reactions also contribute to giving AAC its thermal properties. Aluminum powder reacts with calcium hydroxide and water to form hydrogen. The hydrogen gas foams and doubles the volume of the raw mix (creating gas bubbles up to 3 mm (⅛ inch) in diameter). At the end of the foaming process, the hydrogen escapes into the atmosphere and is replaced by air.

When the forms are removed from the material, it is solid but still soft. It is then cut into either blocks or panels, and placed in an autoclave chamber for 12 hours. During this steam pressure hardening process, when the temperature reaches 190° Celsius (374° Fahrenheit) and the pressure reaches 8 to 12 bars, quartz sand reacts with calcium hydroxide to form calcium silica hydrate, which gives AAC its high strength and other unique properties. After the autoclaving process, the material is ready for immediate use. Depending on its density, up to 80% of the volume of an AAC block is air. AAC's low density also accounts for its low structural compression strength. It can carry loads of up to 8 MPa (1,160 PSI), approximately 50% of the compressive strength of regular concrete.

In other embodiments, the base may be constructed of other materials or, the AAC type material may be covered with another material for aesthetic purposes. For instance, regular concrete may be used in some embodiments. Cast concrete with hollowed out holes in the base may also be used. Other materials may include pumice, CLIMATE-CRETE, LITEBLOK from Cresco Concrete Products, LLC, clay, ceramic, brick, some woods, etc., as well as a combination of these materials or any combination of these materials with AAC. It will be appreciated that any material that can handle the heat of the cooker and provide insulation could be utilized in various embodiments of the base although certainly some materials will be preferred over others from a commercial perspective.

The base 110 is shown as being substantially square shaped with a depth height of several inches, however the height of the base is not limited as the base could be of any height depending on the particular application desired. In the typical embodiments to be described, the base can be from 2-3 inches up to 8-10 inches in height as a non-limiting example. However, in other embodiments, virtually any depth is anticipated.

The base 110, although shown as square, may take on a variety of shapes and the shapes presented herein, although they may be considered as novel, are not limiting but rather exemplary. The illustrated base 110 is shown as having its corners 117 shaved off to create a non-equilateral octagon. The flat surface 117 created at the corners of the base 110 are shown as including a slot 116 for receiving a vertically extended arm 111 of stand 105. The vertically extending arms 111 extend upward from footings 113 that extend from the vertically extending arms 111 toward the center of the base 110 and meet in the middle to form an "X". The structure of the stand 105 may be constructed in a variety of manners. A few non-limiting examples include the stand being rigid and retaining its shape with the legs extending radially out from the center, the feet may be hinged at the center such that the stand can be folded down, or the stand can be disassembled such as including a central hub into which each of the feet can be attached and secured.

A plate 114 rests on top of the upward edges of the feet 113. In the illustrated embodiment, the plate 114 rests within a recesses portion 115 of the feet 113. It should be appreciated that the plate 114 can be removable in some embodiments, or affixed to the feet 115 in other embodiments. In some embodiments, the crucible may be adjustable such that it can be raised or lowered towards/away the bottom of the base 110.

The base 110 rests on the upper portion of the feet 113 and the vertically extending arms 111 slide into slots 116 of the corner facing 117 to securely hold the based 110 in position. It should be appreciated that in embodiments in which the base consists of separate pieces, the stand 105 may operate to secure and hold the pieces together.

Figure 3:
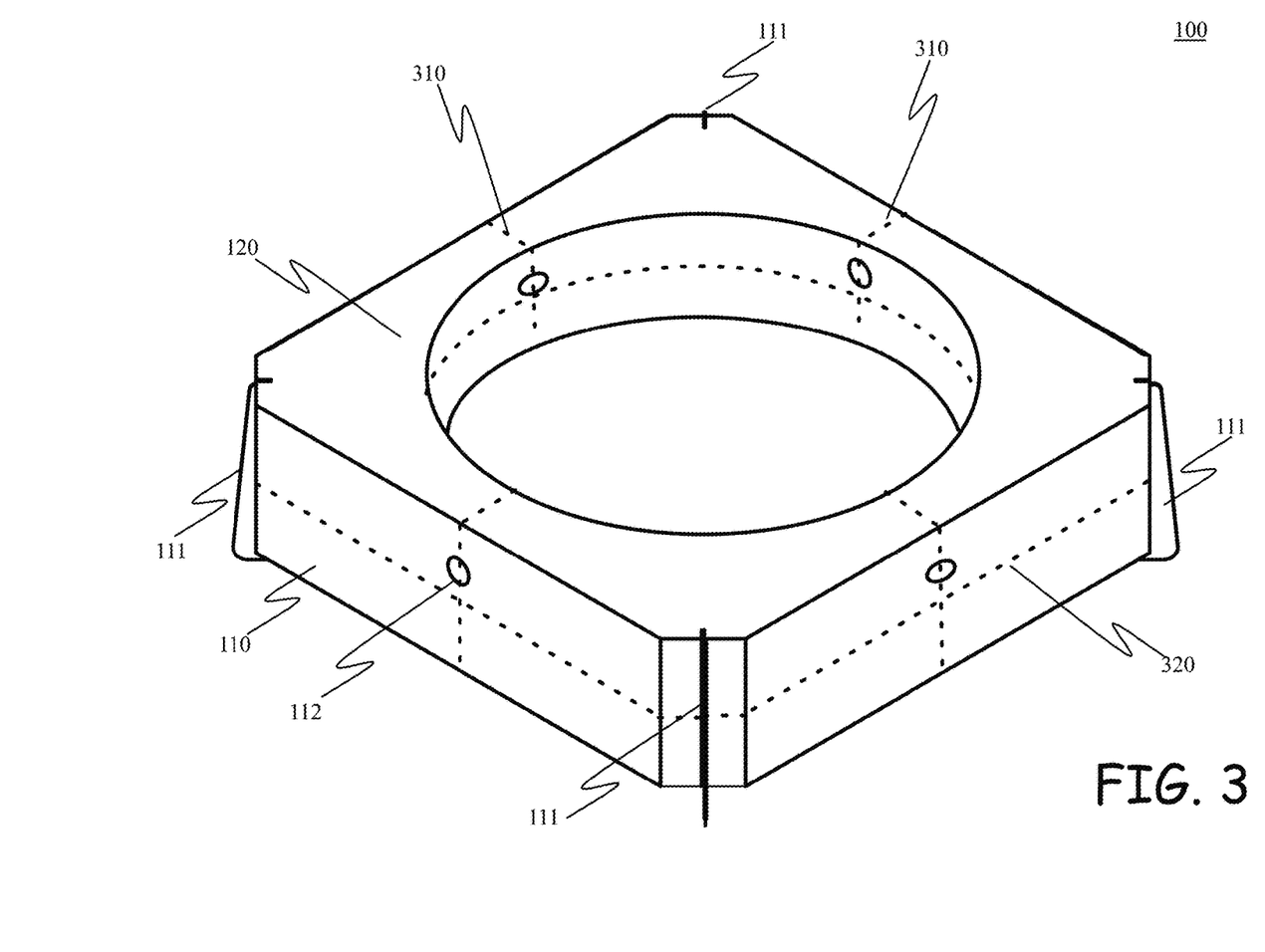
FIG. 3 is a perspective view showing examples of how the base could be divided into multiple parts.

The base 110 defines a void 118 within its interior that extends through the based from the top to the bottom. This is best illustrated in FIG. 3. In the illustrated embodiments, the void 118 is shown as being round and extending through the bottom of the base 110. However, it will be appreciated that in various embodiments, the hole could be any of a variety of shapes. In addition, in some embodiments, the void 118 may only go partially through the base, such as a bowled dugout. In this latter embodiment, the bottom of the void is then the AAC material rather than the plate 114.

The plate 114 effectively seals the bottom of the void 118 within the base 110. In various embodiments, the base 110 include one or more apertures 112 that extend from the exterior wall of the base into void 118. In some embodiments, the aperture 112 is a venturi. As those skilled in the art will appreciate, a venturi is a short tube with a tapering constriction in the middle that causes an increase in the velocity of flow of a fluid or gas and a corresponding decrease in fluid pressure and that is used especially in measuring fluid flow or for creating a suction (as for driving aircraft instruments or drawing fuel into the flow stream of a carburetor). In the present application, the venturi 112 is used to accelerate the provision of air, hence oxygen into the cooking environment and thus greatly increase the amount of heat that can be generated. As will be described more fully below, the venturi 112 may be included in the base 110 as illustrated and/or in the fire bowl assembly 120. The venturi 112 may be located on a side-wall of the base 110 or, it may be located in the bottom surface, top surface or a combination of any of these. One or more venturis may be utilized in the various embodiments. In some embodiments, rather than creating the venturi by tapering the interior walls of the base 110 through the aperture 112, a straight hole may be formed through the wall of the base 110 and a tube including a venturi may be slid into the hole and secured in place. In such embodiments, different tubes may be used to create different levels of airflow by having the various tubes include different tapering ratios and orifice sizes. In other embodiments, an adjustable venturi or venturi valve may be utilized to accomplish the same function.

It will be appreciated that the venturi 112 is only one technique that can be used to create increased airflow within the fire bowl assembly 120. Other accelerators may also be utilized such as electronic fans, piezoelectric air movers, vacuum sources, etc. These other sources may be used in lieu of a venturi or in conjunction therewith.

FIG. 3 is a perspective view showing examples of how the base could be divided into multiple parts. For instance, the base can be stacked like a sandwich by being in multiple slices, such as slices of bread, along a horizontal line 320. In such embodiments, the thickness of the base can be adjusted for different uses by simply adding or removing layers. In addition, the base 110 can be split in to pieces, such as quadrants along a vertical line 310 located at the sides of the base 110. The vertical splits could be through the venturi 112 or to either side of the venturi. Preferably the split would not occur on the corners in alignment with the grove 116 as such an arrangement would require a different mechanism, other than the stand, to hold the pieces together. However, it is certainly anticipated that the base 110 could be split at such locations and other mechanisms could be used to secure the pieces together. In additional diagonal splits or irregular splits are also anticipated. Splitting the base 110 into multiple pieces is advantageous for shipping, cleaning and repair (such as replacement of sections). In addition, it is also appreciated that a single unitary base 110 is also usable.

It should be appreciated that the cooker can be placed on a stand, as described but, the cooker may also be incorporated into a grill, as an accessory or as the main element, into a cabinet, or other type structure and as such, the cooker can be free standing or embedded. For instance, one or more of the cookers could be embedded in an outdoor kitchen such as rock cabinets, an indoor kitchen cabinet, as well as a wide variety of other settings.

Fire Bowl

The fire bowl assembly 120 sits down inside the void 118 defined by the base or crucible 110. The interface between the fire bowl assembly 120 and the base 110 is a ring 122 and flanges 126. The ring 122 may include a tube 128 that fits down within the void 118 in an axially aligned fashion in the illustrated embodiment or, the ring may simply stop at or near the upper surface of the base 110 and not include such a tube 128. If a tube 128 is included, the tube 128 will include openings corresponding with the venturi 112 if necessary. The ring includes an outwardly radiating lip 129 that rests on an upper surface 119 of the base 110.

Around the upper side of the tube 185 and the interior edge of the ring 122 is a plurality of flanges 126. The flanges 126 extend radially inward from the ring 122 and are used to hold the fire bowl 127 by interfacing to the lip of the fire bowl 127 which can be settled down within the interior of the ring 122. Typically at least three flanges 126 should be included but the various embodiments may use any number of flanges 126, either alone or in combination with other mechanisms or, use no flanges 126 and us a bowl with a larger lip that sits on top of the ring 122.

The fire bowl 127 includes one or more orifices or apertures 210 that allow air to be pulled into the fire bowl from the venturi 112 of the base 110 as presented above or, from other sources. A screen, trough, or plate 123 is placed inside the interior of the fire bowl 127 and it rests along an interior edge 223 of the fire bowl 127. It should be appreciated that in some embodiment, a flange may be secured to the inside wall of the fire bowl 127 or on the edge of the screen 123 to help secure and stabilize the screen 123 when inside the fire bowl 127 and in operation. The fire bowl 127 is placed opening up, down into the void 118 of the base 110 and the lip 125 of the fire bowl 127 rests on the flanges 126. It should be appreciated also that the bottom of the fire bowl 127 may rest against the place 114 to provide stability.

The screen 123 include multiple holes or apertures 124 to allow airflow up through coals, charcoal, wood chips, etc., that may be resting on top of the screen 123 and burning. The holes 124 are generally large enough to allow airflow but not so large that the fuel will fall through. It will be appreciated that the screen 123 can take on a wide variety of forms, shapes, materials, etc., and the various embodiments are not limited to any particular size, shape or construction.

Figure 4A:
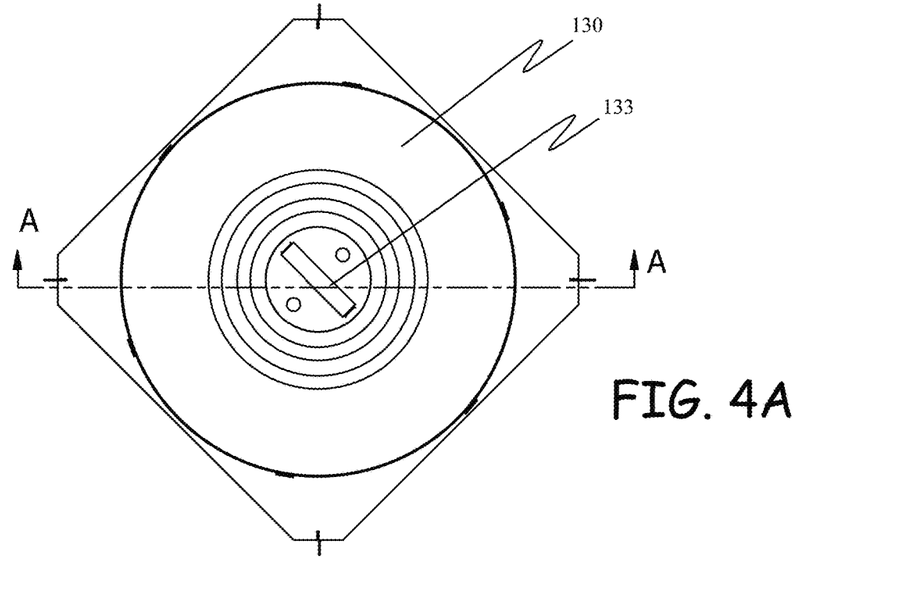
FIG. 4A is a top plan view of the cooker illustrated in FIG. 1.
Figure 4B:
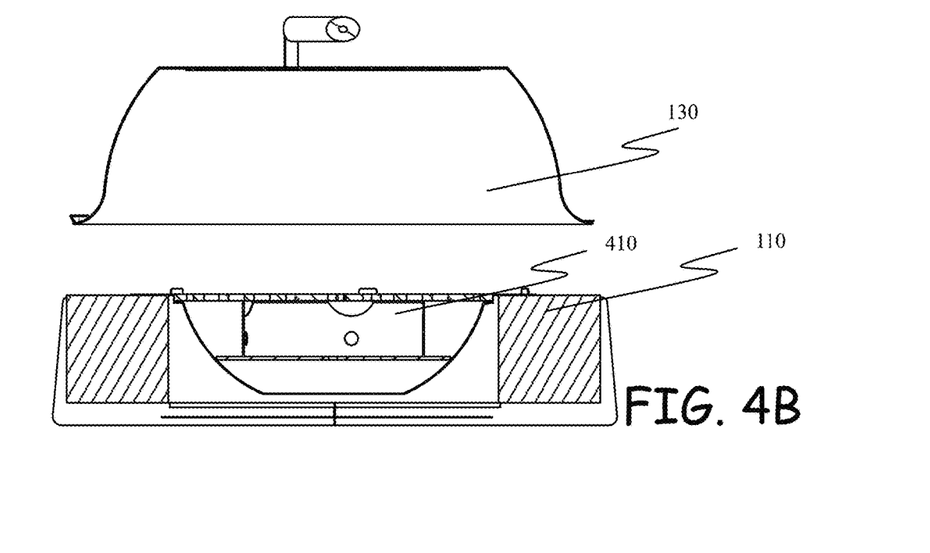
FIG. 4B is a side cross-sectional elevation view of the cooker illustrated in FIG. 1 and FIG. 4A taken at line A-A.
Figure 4C:
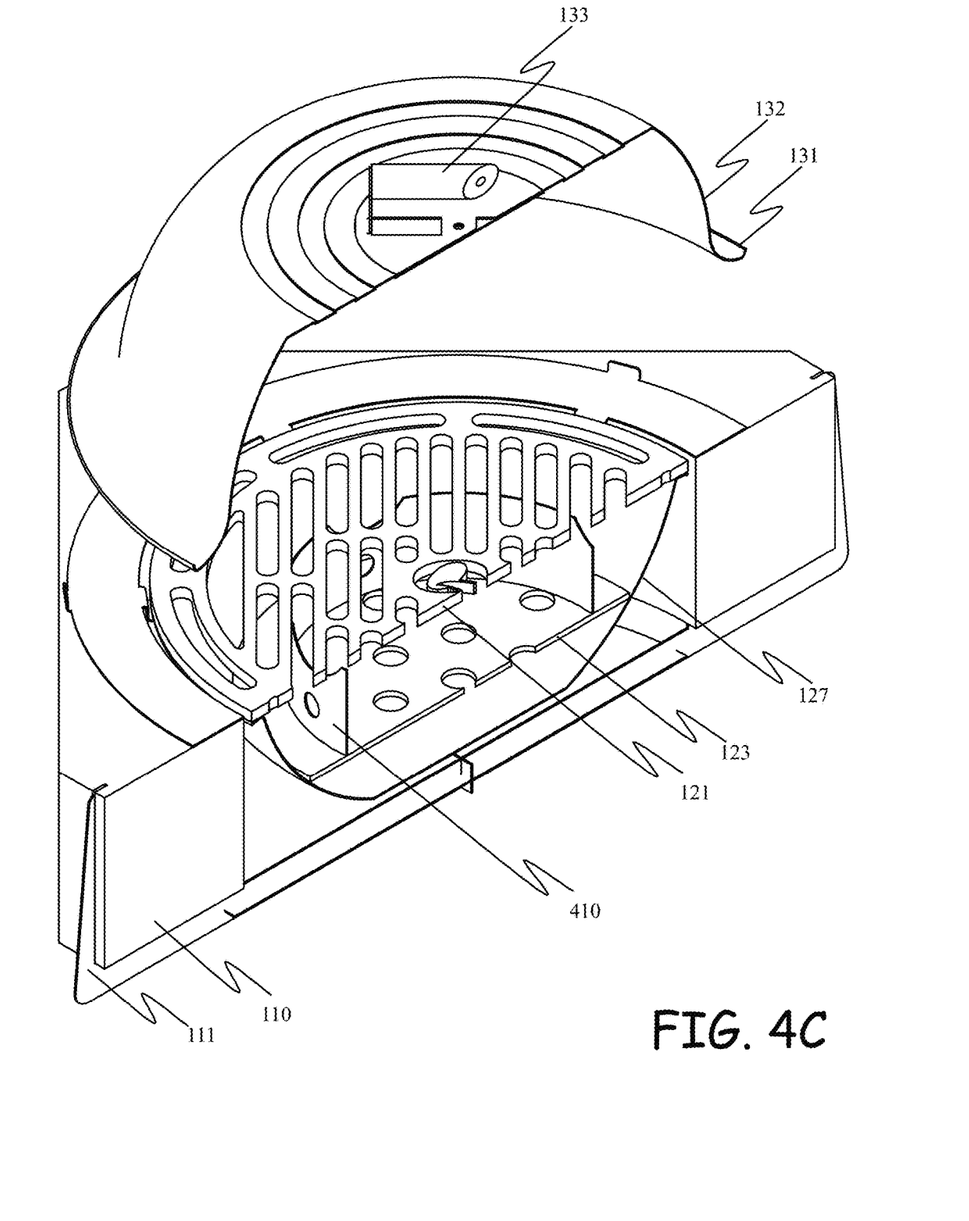
FIG. 4C is a perspective, cross-sectional view of the cooker illustrated in FIG. 1 taken at line A-A of FIG. 4A.
Figures 5A, 5B:
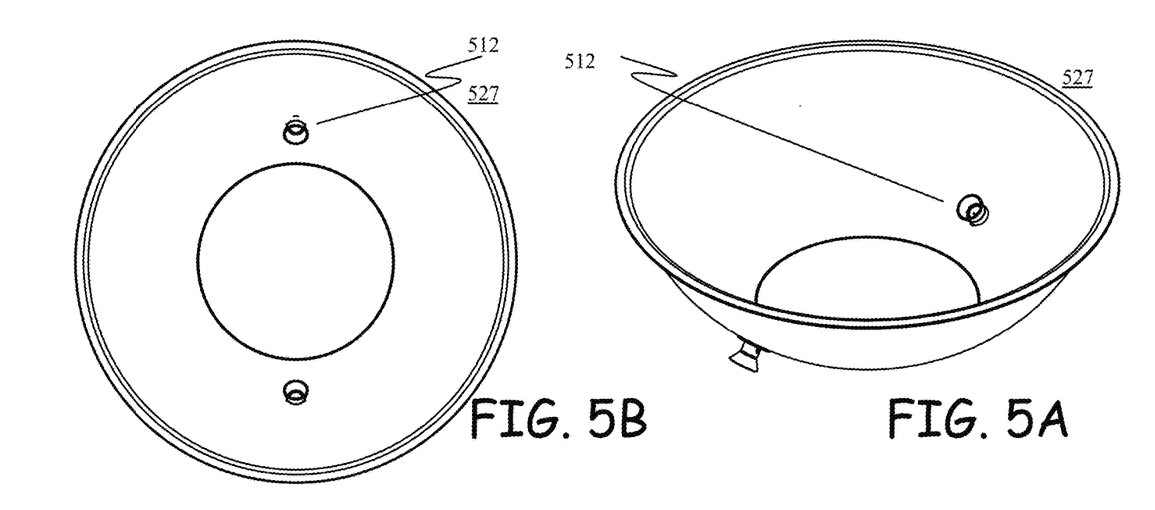
FIG. 5A-FIG. 5D illustrate various views of an alternative fire bowl 527.
Figure 5C:
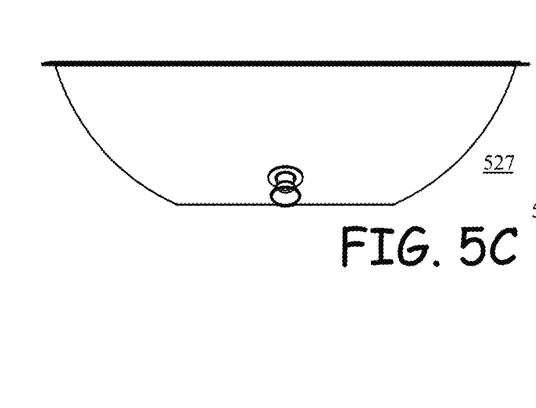
Figure 5D:
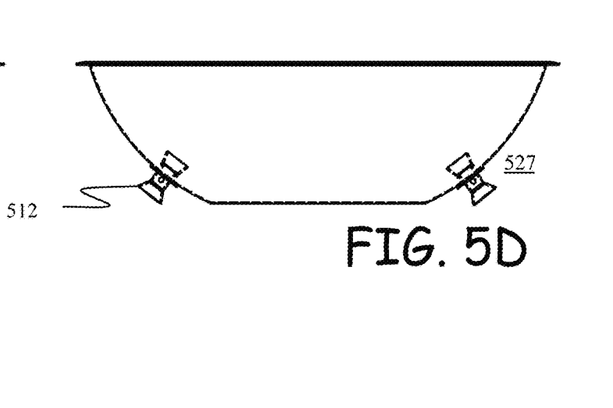

FIG. 4A is a top plan view of the cooker illustrated in FIG. 1. FIG. 4B is a side cross-sectional elevation view of the cooker illustrated in FIG. 1 and FIG. 4A taken at line A-A. FIG. 4C is a perspective, cross-sectional view of the cooker illustrated in FIG. 1 taken at line A-A of FIG. 4A. In FIG. 4C, if can be seen that the cooking grill 121 is nestled down within the lip 125 of the fire bowl 127. Introduced into FIG. 4C is a fire ring 410 which rests on the screen 123. The fire ring 410 can be used to contain the charcoal, wood chips or other fuels at a specific location to increase the intensity of the fire. In the illustrated embodiment, the fire ring 410 is shown as including holes around the side to allow or facilitate airflow.

FIG. 5A-FIG. 5D illustrate various views of an alternative fire bowl 527. In the illustrated embodiment, rather than including apertures in the side of the fire bowl, the fire bowl 527 includes venturis that open into the void 118 of the base 110 and into the interior of the fire bowl 525. In the illustrated embodiment, the bowl 525 include two such venturis 512, although it will be appreciated that more or less than two venturis may be utilized in various embodiments. In some embodiments, multiple venturis can be used with varying parameters between them. In such embodiments, some of the venturis can be blocked off while others are opened to help provide a level of control of the airflow.

Figures 6A, 6B, 6C:
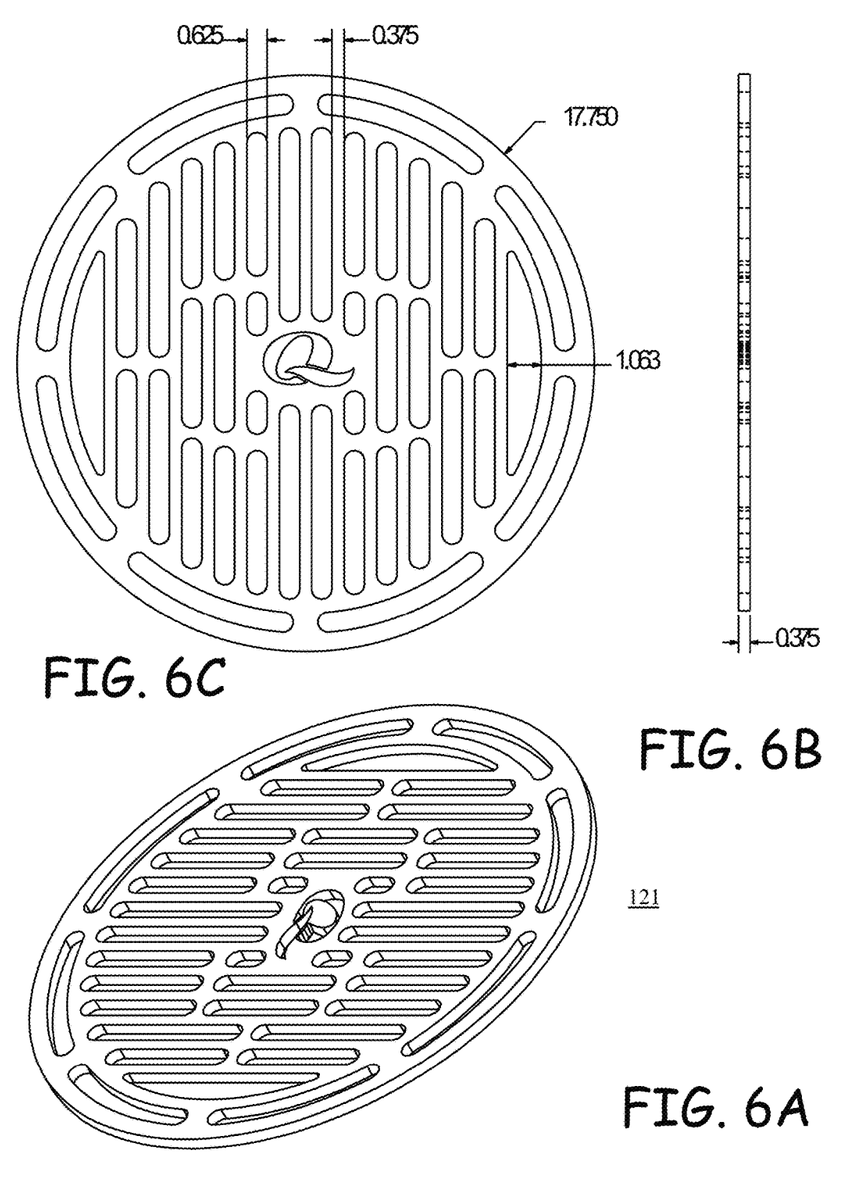
FIG. 6A is a perspective view of an embodiment of a grill 121.
FIG. 6B is a cross-sectional view of the grill illustrated in FIG. 6A.
FIG. 6C is a top plan view of the grill illustrated in FIG. 6A.

The cooking grill or grill surface 121 sits above the fire bowl 127 and receives items to be cooked. In the illustrated embodiment, the grill 121 is round and has a diameter slightly smaller than the opening into the bowl 127. In some embodiments, the grill is constructed of carbon steel and has a substantial mass. Carbon steel is presented as the material for the construction of the grill because of is conductive characteristics. However, it will be appreciated that the grill could be fabricated from stainless steel, as well as a variety of other materials. FIG. 6A is a perspective view of an embodiment of a grill 121. FIG. 6B is a cross-sectional view of the grill illustrated in FIG. 6A and FIG. 6C is a top plan view of the grill illustrated in FIG. 6A. The illustrated embodiment, which is presented as a non-limiting embodiment, is shown as having a diameter of 17.75 inches and a thickness of 0.375 inches. In a particular embodiment, the gill 121 is designed to provide a large amount of mass for retaining heat and providing a profession grade cooking surface. As such, the grill 121 can advantageously be constructed of carbon steel. The slots in the grill have a thickness of 0.625 inches while the wall between them is typically around 0.375 inches. Although a wide variety of materials and structures may be utilized in various embodiments, the carbon steel material with a ratio of surface to hole as illustrated in this embodiment has been shown to provide good results.

Figure 7A:
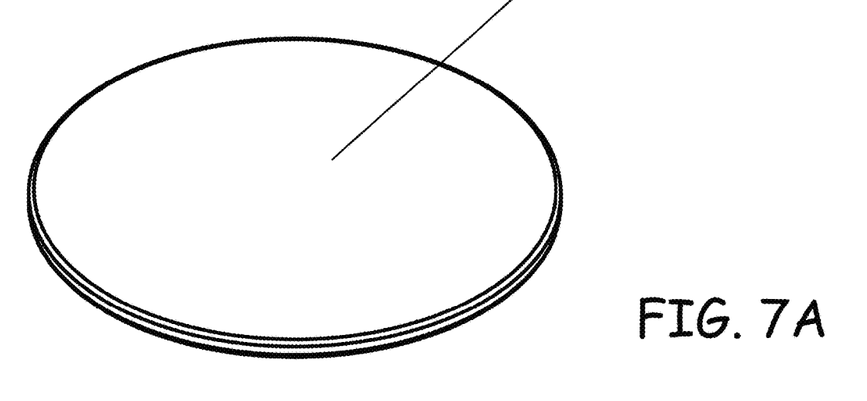
FIG. 7A is a perspective view of a stone, slate or other material cooking surface that can be placed on the grill 121.
Figure 7B:
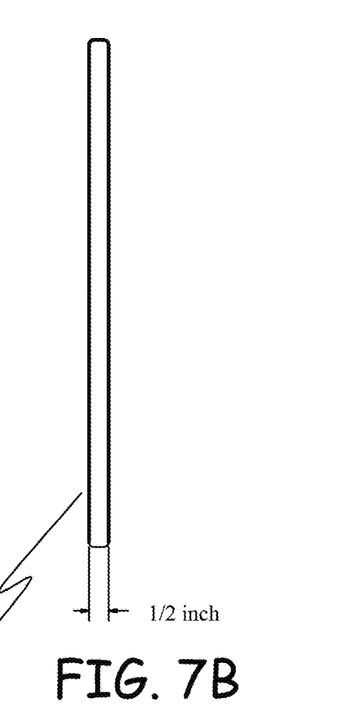
FIG. 7B is a side view of the stone cooking surface of FIG. 7A.
Figure 7C:
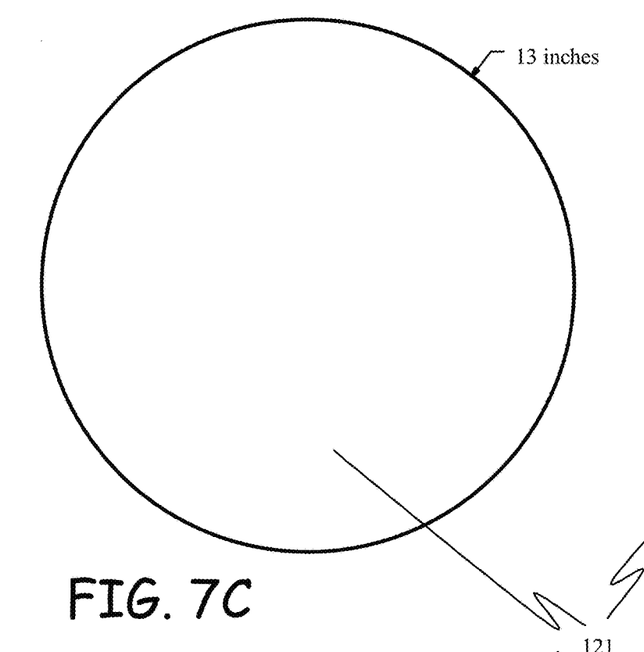
FIG. 7C is a top plan view of the cooking surface of FIG. 7A.

FIG. 7A is a perspective view of a cooking surface that can be placed on the grill 121. FIG. 7B is a side view of the stone cooking surface of FIG. 7A. FIG. 7C is a top plan view of the cooking surface of FIG. 7A. The cooking surface 721 can be fabricated from a variety of materials such as ceramic, stone, slate or other materials. The cooking surface 721 can be used for cooking items such as bread, Panini, pizza, etc. As illustrated, the diameter of the cooking surface 721 is 13 inches, which would leave a gap around the outer edges if it was sitting and centered in the grill 121. Thus, the flames from below could rise and provide radiant heat to items on the edges of the cooking surface 721, while convection and conductive heat are also applied. However, in some embodiments the stone cooking surface 721 may complete cover the grill 121 and in other embodiments, the stone cooking surface may replace the grill 121. Yet in other embodiments, the stone cooking surface may include any of the above-listed configurations along with one or more apertures extending through the stone cooking surface 721.

Dome Cover or Lid

A dome cover or lid 130 sits on top of the cooking surface 121 and over the fire bowl 127. The dome cover 130 includes a lower lip 131 that rests upon the ring 122. The ring 122 may include additional flanges 226 that help to hold the dome cover 130 in place when it is resting upon the top of the base 110 and ring 122. The lower lip 131 of the dome cover 130 is illustrated as flaring outwards but, it will be appreciated that it could be tucked under, flat, or in line with the remainder of the dome cover 130. From the lower lip, a side-wall 132 extends upwardly to the top, where the dome includes a handle 133 for lifting and moving of the dome. In the illustrated embodiment, concentric ridges and grooves 134 are provided to help dissipate heat, provide strength to the cover and/or aesthetic appeal.

Figure 8A:
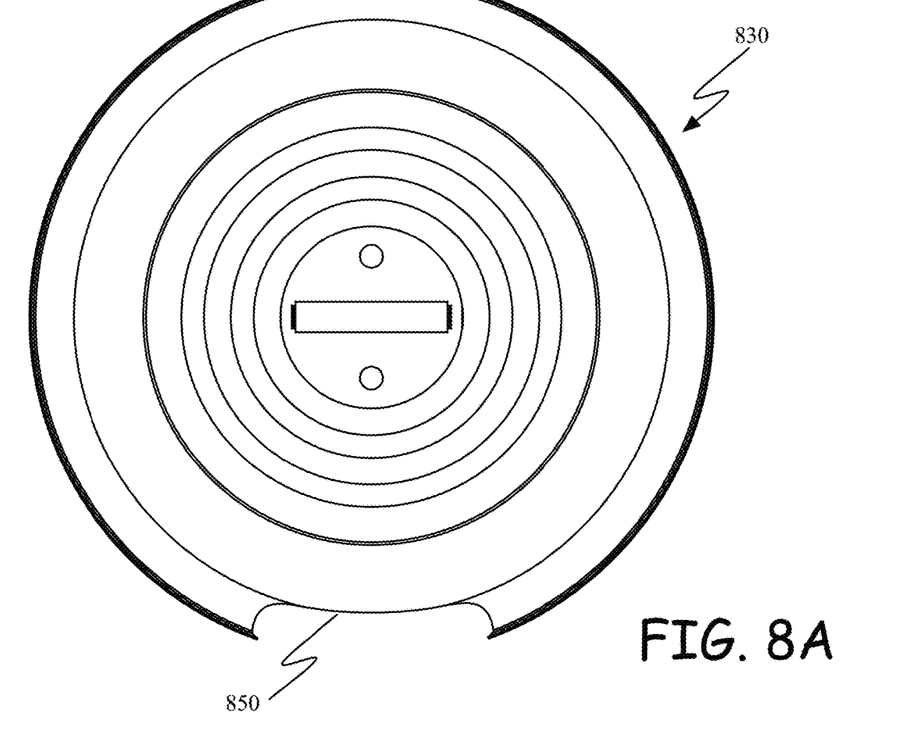
FIG. 8A, FIG. 8B and FIG. 8C illustrate an alternative embodiment of the dome cover.
Figure 8B:
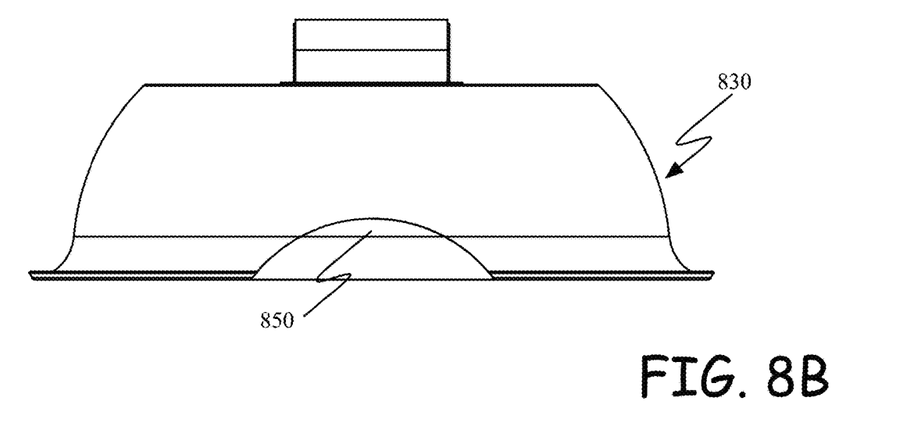
Figure 8C:
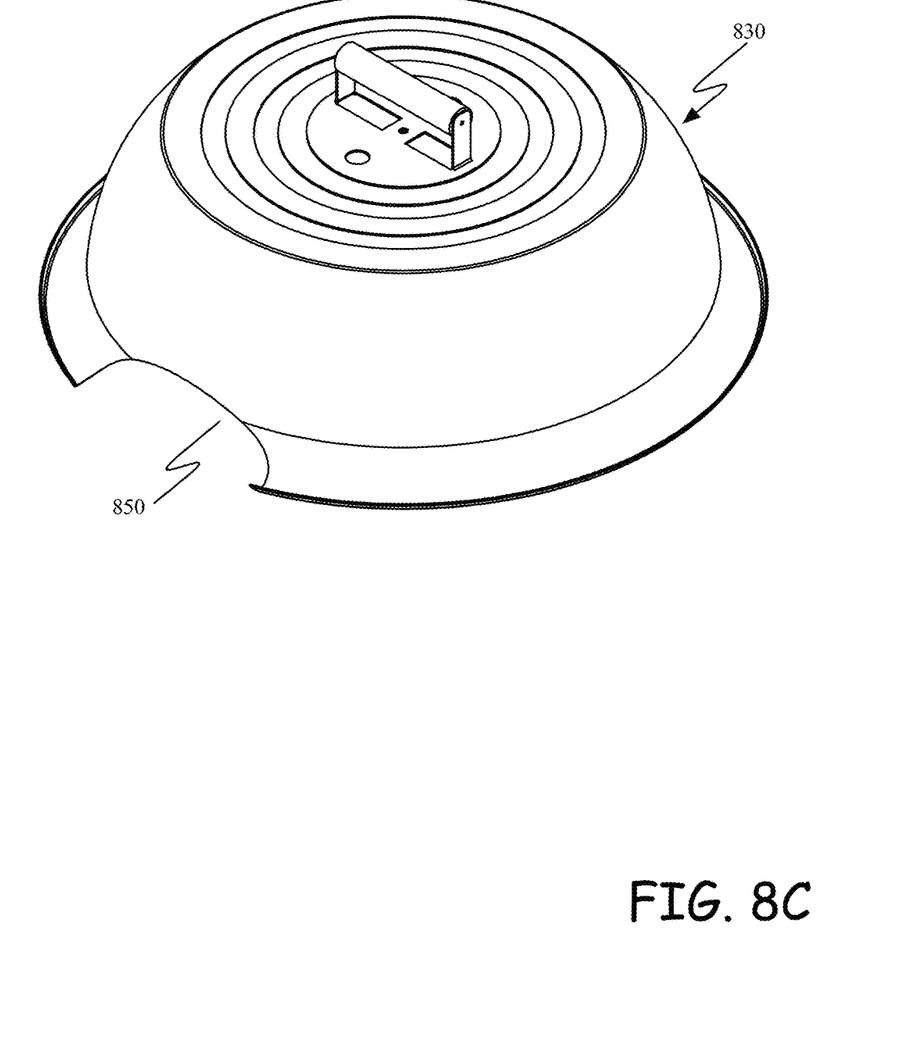

FIG. 8A, FIG. 8B and FIG. 8C illustrate an alternative embodiment of the dome cover. In this embodiment, a dome cover 830 includes a side opening 850 defined by the side wall and lip of the dome cover 830. Advantageously, such an embodiment allows a user to watch the contents that are being cooked and to help regulate air flow. In some embodiments, the opening can be adjustable or selectively opened and closed. In some embodiments, the opening 850 may be substantially larger allowing a person to actually turn the contents on the grill, insert or remove a pizza, insert or remove other food items, etc.

Figure 9A:
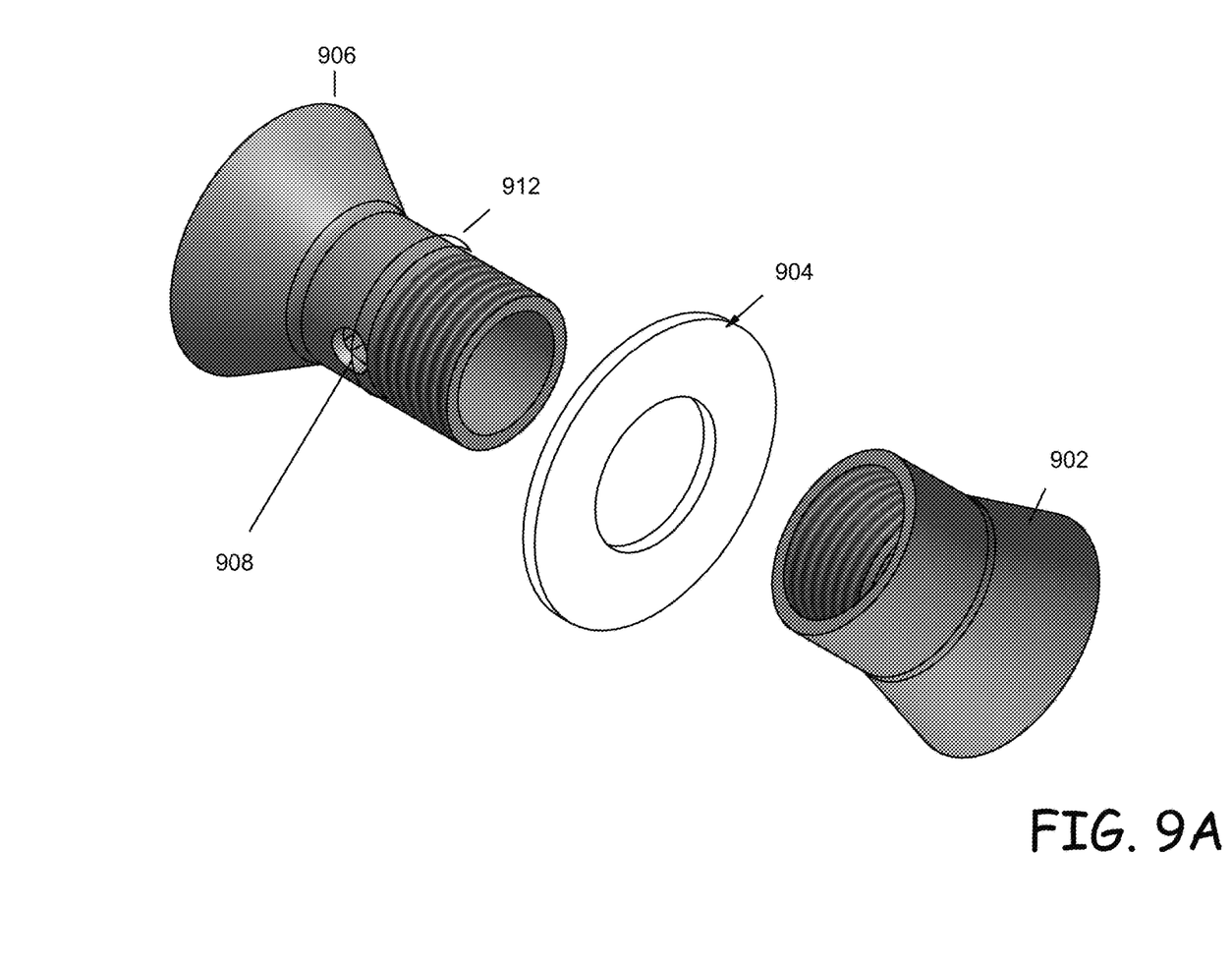
FIG. 9A, FIG. 9B and FIG. 9C illustrate an embodiment of a venturi that could be used in various embodiments of the cooker.
Figure 9B:
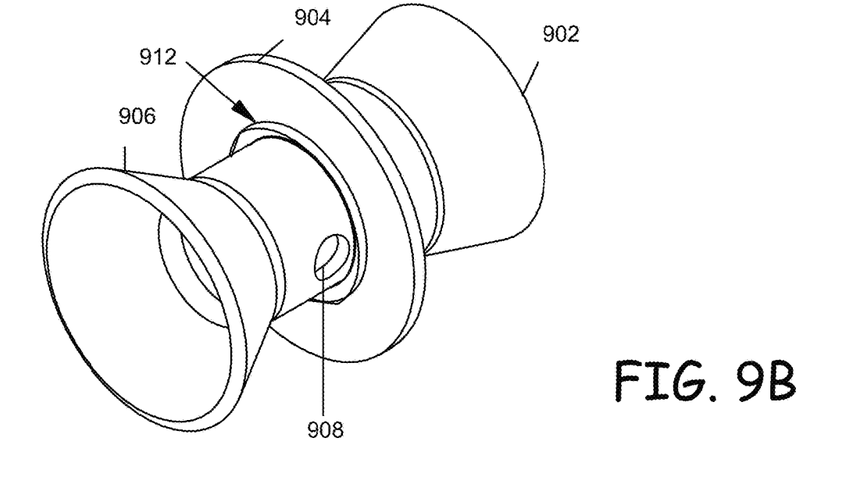
Figure 9C:
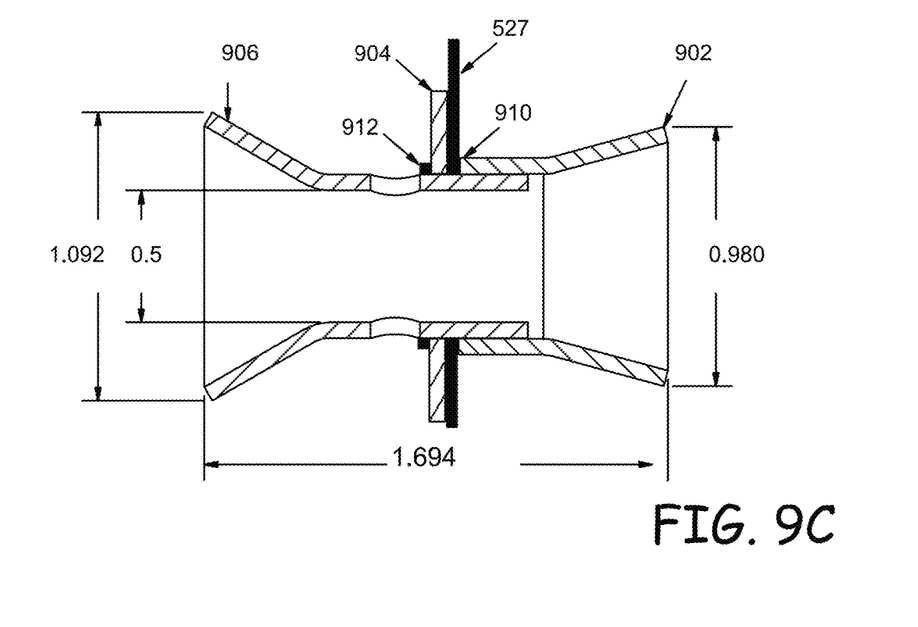

FIG. 9A, FIG. 9B and FIG. 9C illustrate an embodiment of a venturi that could be used in various embodiments of the cooker. FIG. 9A is a perspective exploded view of an exemplary design for a venturi 912. The venturi 912 is shown as including three parts, an outer port 906, an inner exit 902 and a washer 904. The outer port 906 includes one or more apertures 908 in the side to increase airflow. To assemble, such as onto the side of the fire bowl 527, the outer port 906 is slid through an opening in the center of washer 904 and then through an aperture on the side of the fire bowl 527. The inner exit 902 is then connected to the outer port 906, such as by the threads illustrated in FIG. 9A. The edge 910 of the inner exit 902 tightens to rest against the inside edge of the wall of the fire bowl 525, while the washer 904 is pressed up against the outer surface of the wall of the fire bowl 525, such as by nub or rim 912. In some embodiments a ring may be placed around the outer port 906 to allow the openings 908 to be opened or closed. In other embodiments an insert may allow the opening through the center bore of the venturi 912 to be adjusted. In the illustrated non-limiting example depicted in FIG. 9C, the opening into the outer port 906 is 1.092 inches and the opening into the inner exit 902 is 0.980 inches. The length of the venturi 912 from end to end is 1.694 inches and the pinch down through the bore of the venturi 0.5 inches. It will be appreciated that these figures are one example of a venturi and it is anticipated that other sizes, ratios and configurations could be utilized.

Referring back to FIG. 2, in operation, the stand 105 can be placed on a flat surface and the plate 114 can be set on the stand and the base 110 can be set on the stand with vertical arms 111 coinciding with grooves 116. The ring 122 can be placed over the edge of the void 118 and the fire bowl 127 can be set down inside the ring 122 and the void 118 while the lip 125 of the fire bowl 127 comes to rest on the flanges 126. The screen 123 can then be set down inside the fire bowl 127 and fuel, such as charcoal, wood chips, etc., can be placed on the screen 123, with our with out the fire ring 410. The fuel can be lit and then the grill plate 121 placed over the fire bowl 127. When the fire is ready, food items can be placed on the grill plate 121 and the cover 130 can optionally be placed over the food depending on the cooking technique desired. The fire from the fire bowl 127 will directly cook the food items through the grill plate 121. Further, the grill plate 121 will heat up substantially also helping to cook the food items by conduction. With the dome cover 130 in place, the food items are also cooked by means of convection.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A cooker comprising:
   a base, the base defining void within the base including at least one aperture extending from an exterior wall of the base to the interior void;
   a fire bowl configured to sit within the void of the base and defining at least one aperture through the side of the fire bowl, wherein the base aperture and the fire bowl aperture are aligned with each other forming an airflow path into the fire bowl;
   a grate that is configured to sit above the fire bowl;
   a cover that sits on top of the base and covers the grate; and
   a venturi that is associated with the base aperture and the fire bowl aperture to alter the air flow through the airflow path into the fire bowl.

2. The cooker of claim 1, wherein the base aperture is defined by walls and the venturi is defined by the walls of the base aperture and thus, is within the base aperture.

3. The cooker of claim 1, wherein the base is fabricated from autoclaved aerated concrete.

4. The cooker of claim 3, wherein the grate is fabricated of carbon steel.

5. The cooker of claim 4, wherein the grate has a thickness of 0.375 inches.

6. The cooker of claim 4, wherein the grate has a thickness of 0.25 to 0.5 inches.

7. The cooker of claim 4, wherein the grate has a plurality of slots.

8. The cooker of claim 1, wherein the cover defines an opening in the side to allow for observing items cooking on the grate and placement and movement of items.

9. The cooker of claim 1, further comprising a stone plate that sits on top of the grate.

10. The cooker of claim 1, wherein the fire bowl includes a screen for holding a fuel item.

11. The cooker of claim 10, wherein the screen includes a fire ring for concentrating the fuel into a confined area.

12. The cooker of claim 1, further comprising a stand for receiving the base.

13. The cooker of claim 12, wherein the base is in a plurality of pieces and the stand holds the base together.

14. The cooker of claim 1, wherein the opening through the venturi can be adjusted.

15. The cooker of claim 1, wherein the venturi can be any of a plurality of venturis with different tapers and diameters.

16. The cooker of claim 1, wherein the venturi includes an outer port, and inner exit and a washer and the venturi is attached through the aperture of the fire bowl by placing a threaded end of the outer port through the washer and through the aperture and then, screwing a threaded end of the inner exit onto the threaded end of the outer port.

17. A cooker comprising:
   a base, the base defining an interior void within the base and including at least one aperture extending from an exterior wall of the base to the interior void and the base including a thermally insulating material;
   a ring that sits around the perimeter of the void in the base and includes a plurality of flanges,
   a fire bowl configured to sit within the void of the base and to rest upon the plurality of flanges, the fire bowl defining at least one aperture through the side of the fire bowl;
   a screen that is placed into the interior of the fire bowl for receiving a fuel substance;
   a grate that is configured to sit above the fire bowl;
   a cover that sits on top of the base and covers the grate; and
   a venturi that is associated with the base aperture and the fire bowl aperture to alter the air flow through an airflow path into the fire bowl defined by the base aperture and the fire bowl aperture.

18. The cooker of claim 16, wherein the venturi includes an outer port, and inner exit and a washer and the venturi is attached through the aperture of the fire bowl by placing a threaded end of the outer port through the washer and through the aperture and then, screwing a threaded end of the inner exit onto the threaded end of the outer port.

19. The cooker of claim 16, wherein the base is constructed from autoclaved aerated concrete.

20. A cooker comprising:
   a base, the base defining an interior void within the base, the base including a plurality of apertures, wherein each aperture extends from an exterior wall of the base to the interior void;
   a fire bowl configured to sit within the interior void of the base, the fire bowl defining a plurality of apertures through the wall of the fire bowl, wherein the base apertures and the fire bowl apertures define one or more airflow paths into the fire bowl;
   a grate that is configured to sit above the fire bowl; and
   at least one venturi, wherein each of the at least one venturis is positioned within at least a portion of one of the one or more airflow paths, whereby the airflow path into the fire bowl is effected by the venturi.

\* \* \* \* \*